United States Patent

Wugofski et al.

[11] Patent Number: 5,852,437
[45] Date of Patent: Dec. 22, 1998

[54] WIRELESS DEVICE FOR DISPLAYING INTEGRATED COMPUTER AND TELEVISION USER INTERFACES

[75] Inventors: Theodore David Wugofski, Fort Worth; John Martin Baker, Keller, both of Tex.

[73] Assignee: AST Research, Inc., Irvine, Calif.

[21] Appl. No.: 719,260

[22] Filed: Sep. 24, 1996

[51] Int. Cl.[6] .................................................. H04N 7/00
[52] U.S. Cl. ............................... 345/327; 455/6.3; 348/12
[58] Field of Search ..................................... 348/552, 731, 348/738, 725, 441, 445, 462, 497, 7, 12, 13, 10; 345/327; 455/6.16, 2, 6.3; H04N 7/00

[56] References Cited

U.S. PATENT DOCUMENTS 5,272,525 12/1993 Borchardt .
5,410,735 4/1995 Borchardt .
5,675,390 10/1997 Schindler et al. ...................... 348/552

*Primary Examiner*—Nathan J. Flynn
*Attorney, Agent, or Firm*—Knobbe, Martens, Olson & Bear, LLP

[57] ABSTRACT

A two-way wireless local transmission system integrates computer and television user interfaces. A television set-top device includes a separate transmitter and receiver. The transmitter converts an audio and video signal into a modulated signal within the 902–928 MHz frequency band and transmits the modulated signal to a receiver associated with a computer peripheral device. The receiver downconverts the modulated signal and processes the signal within the computer. The computer processed signal is then sent by a transmitter in the computer peripheral device to the receiver in the set-top device, which provides the signal to a television receiver which displays images in response to the received signals.

4 Claims, 3 Drawing Sheets

WIRELESS DEVICE FOR DISPLAYING INTEGRATED COMPUTER AND TELEVISION USER INTERFACES

BACKGROUND OF THE INVENTION

1. Field of the Invention

The present invention relates to the integration of personal computers with television using wireless local signal transmissions.

2. Description of Related Art

For years, the television has been the center of entertainment in the average American household. Over these years, televisions have continually improved by providing among other things better picture quality, better sound and larger screens. However, even with all the advances in television technology, televisions remained only as a source to display the programs broadcast by the networks.

The advent of personal computers provided many households with a new addition to their entertainment system. However, in addition to entertaining, many people have found the personal computer to be a productive addition to the house. The computer can be used for a wide variety of activities ranging from playing games to paying bills.

In recent years, many households have sought to combine the entertainment of a television with the flexibility of a computer. By combining the two systems, they are able to enhance the television viewing experience. A computer-television combination makes it possible to create a "smarter" television that allows not only static viewing, but the ability to interact and control the programming.

Current integration of personal computers with television is performed through wired technology. An antenna or a video source is directly connected to the computer through a cable. The computer overlays graphical user interfaces and then distributes the integrated video to the television through another cable connection.

In a typical house, the living room includes a cable or antenna connection for the television, and an office or a bedroom includes the personal computer. The computer is usually connected to a phone line by a modem to access the Internet or other on-line services. In the past, if a user wanted to integrate their computer and television, either the computer had to be moved to the living room or the television had to be moved to the office or to the bedroom. Unfortunately, neither of these options are desirable. Most families want their television to remain in the living room, usually a larger room and the evening gathering place for family entertainment. Also, these families did not want to move a desk with the computer into the living room for both aesthetic and practical reasons, because additional wiring usually has to be installed for use with the computer. For example, if the computer is moved to the living room, an additional phone jack must be installed to connect the modem. Similarly, if the television is moved to the den, an additional antenna or cable connection must be installed. What is needed is a device that allows users to integrate computers and televisions while allowing the computer and the television to be located in separate rooms of the house thereby minimizing the need to co-locate items or to install additional wiring.

SUMMARY OF THE INVENTION

The present invention creates a two-way wireless connection between a personal computer and a video source. The wireless connection allows the computer to be located in a different room than the video source and the television. Television signals are sent to the computer via the wireless connection so that the television signals can be integrated with computer data. The computer includes software applications and can include a modem. With the present invention, the modem can be located in one room and used by a user in a different room to browse the Internet or to access other on-line services. After the computer processes the data, the results are sent via the wireless connection back to the television to be displayed to the user.

One aspect of the present invention is a method of establishing a wireless connection between a video device and a computer. The method comprises the steps of receiving a television signal at a first location and upconverting the television signal. The upconverted signal is then transmitted from the first location and is received at a second location. The upconverted signal is downconverted at the second location and the downconverted signal is processed by the computer to produce digital video data. The digital video data is converted into analog composite video, which is then upconverted and transmitted from the second location back to the first location. The upconverted analog composite video is received at the first location, where the upconverted analog composite video is downconverted and input into a video device.

Another aspect of the present invention is a wireless connection between a television and a computer. The wireless connection comprises a first transmitter which receives a television signal and broadcasts the television signal over a first channel. A first receiver receives and downconverts the television signal for use by the computer. A video processor in communication with the computer converts the television signal into digital video data. A video encoder receives the digital video data from the video processor and converts the digital video data into an analog composite video. A second transmitter receives the analog composite video from the video encoder and broadcasts the analog composite video over a second channel, where a second receiver receives and downconverts the analog composite video for use by the television.

DETAILED DESCRIPTION OF THE PREFERRED EMBODIMENT

Figure 1:
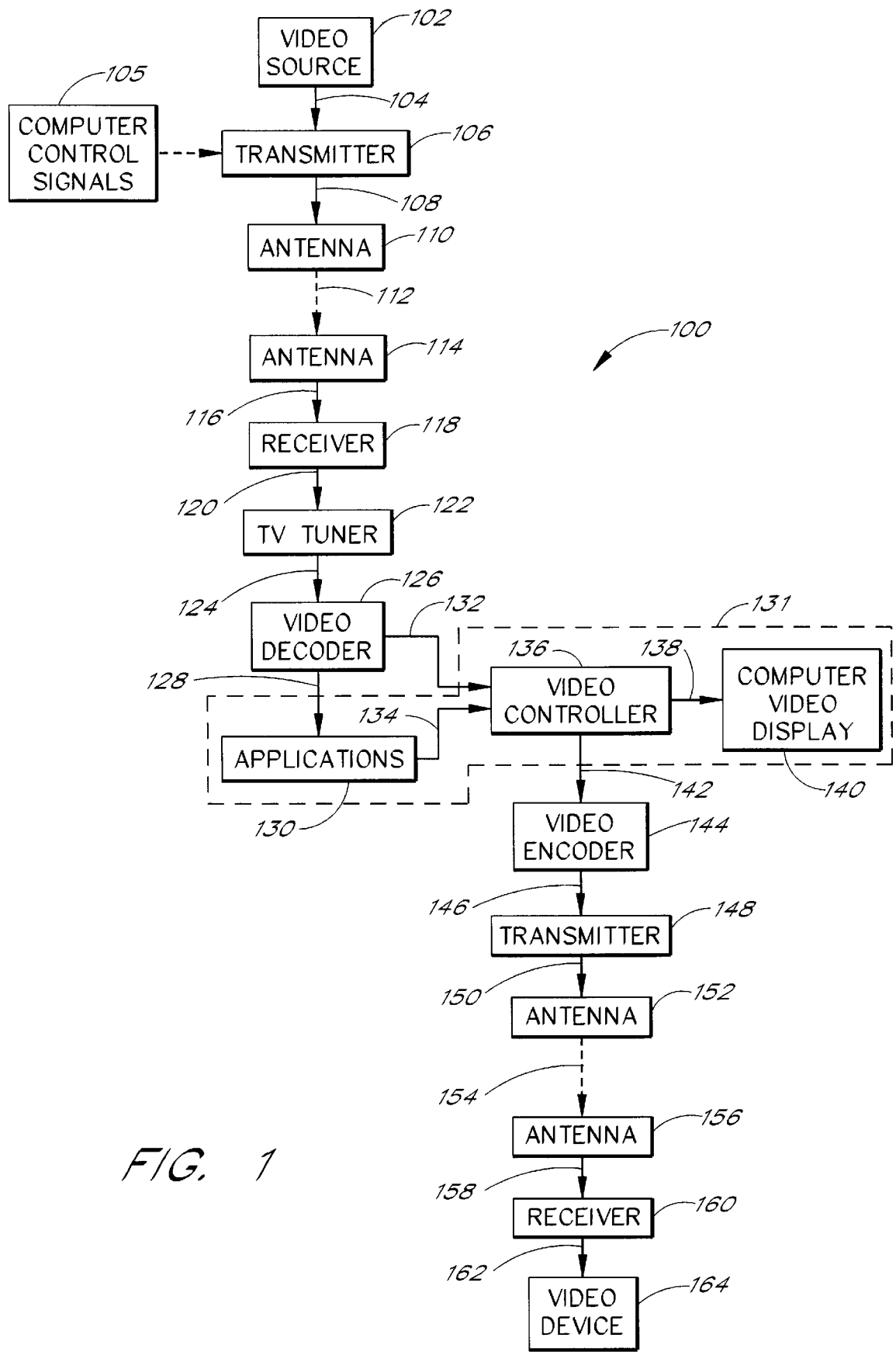
FIG. 1 is a block diagram of the preferred embodiment of the present invention.

A two-way wireless device 100 is illustrated in FIG. 1 for local two-way wireless transmission of signals between a computer 131 and a television or other display device 164. The transmissions are provided within the 902–928 MHz frequency band. This band has been established for these purposes by the United States Federal Communications Commission (FCC). A video source 102, such as a coaxial cable, outputs baseband video and audio signals. It will be appreciated that any suitable source of video and/or audio signals, such as a video disk player, video cassette recorder (VCR), satellite dish, etc., may replace the coaxial cable as the video source 102 in the embodiment of FIG. 1. A transmitter 106 receives the baseband video and audio signals through a line 104.

The transmitter 106 modulates a selectable carrier to produce a modulated carrier having a frequency of either 912 MHz or 922 MHz and outputs the modulated carrier along a line 108 to a transmitting antenna 110. More specifically, the transmitter 106 includes a modulator which is provided with the baseband video and audio signals and serves to selectably produce a conventionally modulated television signal within either television broadcast channel 3 or channel 4, as established by the FCC. The conventional television signal in turn modulates the selected carrier to produce a transmitter output signal 108 at either 912 MHz or 922 MHz, as selected by the user. It will therefore be appreciated that the transmitter 106 is also capable of receiving an input signal within either television broadcast channel 3 or channel 4 and directly modulating the carrier with the received signal. In other words, the transmitter 106 converts a television signal including audio and video signal components to an upconverted broadcast video signal 112 within the 902 MHz–928 MHz local transmission frequency band.

In accordance with FCC regulations, the transmitting antenna 110 is a quarter-wave, non-directional transmitting antenna limited to 500 microwatts of power. Such restrictions are intended to limit the radiated power in order to minimize interference between local wireless transmission systems sharing the same transmission frequencies. Antennas and transmitters meeting these specification are manufactured and can be obtained from Recoton Inc. of Long Island, N.Y.

A receiving antenna 114 is coupled to an antenna input of a receiver 118. The receiving antenna 114 receives the broadcast video signal 112 from the transmitting antenna 110 and provides the broadcast video signal 112 as an input 116 to the receiver 118. The receiver 118 amplifies the received signals, selects the desired signals within the 902–928 MHz frequency band and downconverts the selected signals to either television broadcast channel 3 or channel 4. The downconverted signals are provided by the receiver 118 via an output terminal 120 to a first fixed input terminal of a television tuner 122. Therefore, the television tuner 122 is provided with the downconverted signals from the output 120 of the receiver 118, so that the output of the video source 102 is made available to be tuned by the television tuner 122 without the need for a hard wired connection therebetween.

As is well known in the art, the television tuner 122 converts the downconverted broadcast video signal into an analog composite video signal, one example of which is a conventional NTSC signal. The analog composite video signal is then sent along a line 124 to a video decoder 126. The video decoder 126 converts the incoming analog composite video signal from the television tuner 122 into a digital video signal such as a conventional VGA signal. Video decoders capable of converting NTSC and similar television signals into digital video signals such as VGA are well known in the art and can be readily obtained. After the video decoder 126 has converted the incoming television signal from the television tuner 122 into a digital video signal, the digital video signal is supplied to both a video controller 136 via a line 132 and to application software 130 running on the personal computer via a line 128. The computer receives computer control signals 105 from a wireless keyboard and pointing device (not shown). In the preferred embodiment, a RF wireless keyboard and pointing device is used as is well known in the art.

The application software 130 manipulates the digital video signal supplied from the video decoder 126 and provides it to a user through user interfaces. In the preferred embodiment, the user interfaces are graphical user interfaces, although any interface can be used. The computer 131 is used to create a "smarter" television. Some examples of features added by the computer include accessing and displaying a program guide over the television video. Further, family members may access the Internet to create a more interactive viewing experience if additional information is desired about the subject matter of a program.

After processing the digital video signal provided by the video decoder 126, the application software 130 supplies the manipulated data via a line 134 to the video controller 136. The video controller 136 then combines the raw digital video signal provided by the video decoder 126 and the manipulated data provided from the computer applications 130. The video controller 136 transmits this data via a video line 138 to be displayed to the user on a computer video display 140. The video controller 136 also provides the same digital video signal to a video encoder 144 via a line 142 so that the data is transmitted to and displayed by the television or other video device 164. The digital video data on the line 142 is now a combination of the television signal sent from the video source 102 and any user interface signals provided by the computer 131 from the software applications 130, such as, for example, a program guide superimposed over a standard television program. The video encoder 144 receives the digital video data on the line 142 and converts the digital video data into an analog composite video signal. Many off-the-shelf video encoders are capable of performing this conversion and are well known in the art. The analog composite video signal is sent via a line 146 to a transmitter 148 which upconverts and amplifies the signal. The signal is then sent via a line 150 to a transmitter antenna 152 for wireless broadcast 154 over the local transmission band. The wireless broadcast 154 is received by an antenna 156 which then sends the signal through a line 158 to a receiver 160. The receiver 160 downconverts the local transmission signal to a local frequency band and provides the downconverted signal along line 162 as an input to the external video device 164. The external video device 164 may be a television, a video cassette recorder or any other device capable of receiving video signals.

FIG. 1 shows all the components necessary to implement the two-way wireless device 100 of the present invention. It will be appreciated however that, in the preferred embodiment, certain components of the two-way wireless device 100 will be co-located with the video device 164 while other components are co-located with the computer 131. Because the computer 131 and the video device 164 are typically located in different rooms of the house, separate component packages must be created to ensure proper component location.

Figure 2:
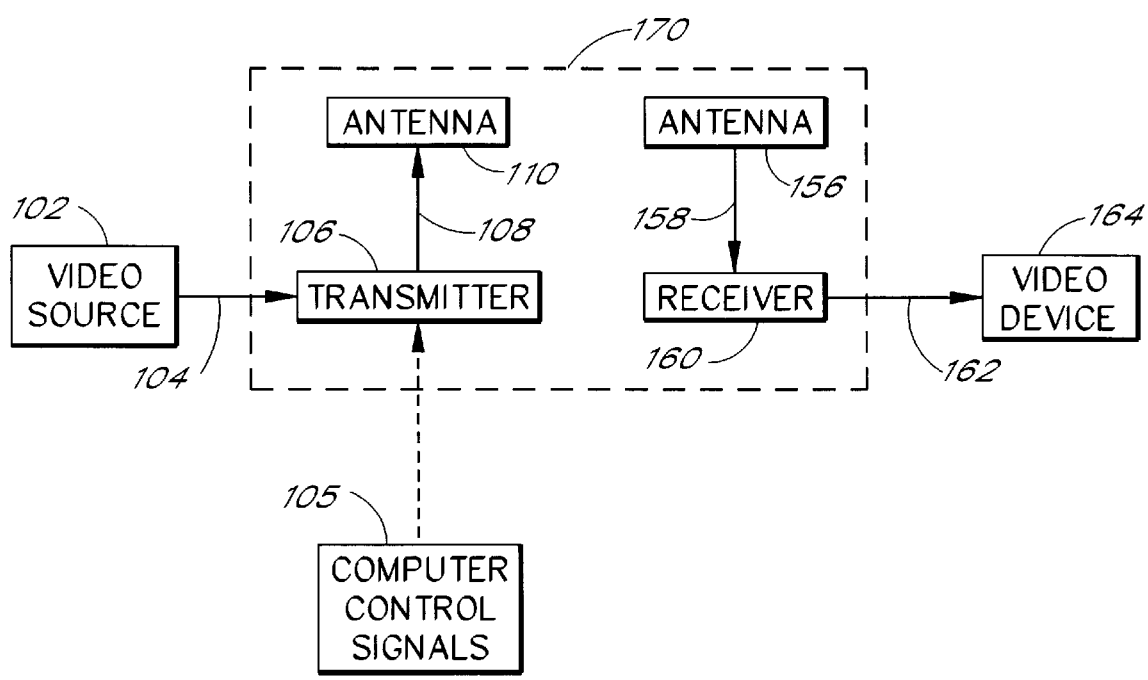
FIG. 2 is a block diagram which shows the television set-top device used in the present invention.

FIG. 2 is a block diagram illustration of a set-top device 170 to be co-located with the video device 164, usually a television. The set-top device 170 includes the transmitter 106, the antenna 110, the receiver 160, and the receiving antenna 156. A signal is provided from the video source 102 along the line 104 to the transmitter 106. As described above, the transmitter 106 upconverts and amplifies the video signal and sends the transmitter output signal 108 to the transmitter antenna 110 where it is broadcast over a first channel of the local transmission band. Simultaneously, the receiving antenna 156 receives video information which has already been processed by the computer and transmitted via a second channel of the local transmission band. The signal received by the receiving antenna 156 is transmitted along the line 158 to the receiver 160. The receiver 160 downconverts the computer processed signal and provides it via the line 162 to the video device 164 to be displayed thereon.

As can be seen in FIG. 2, only the first transmitter 106 and the second receiver 160 are actually located near the video device 164.

Figure 3:
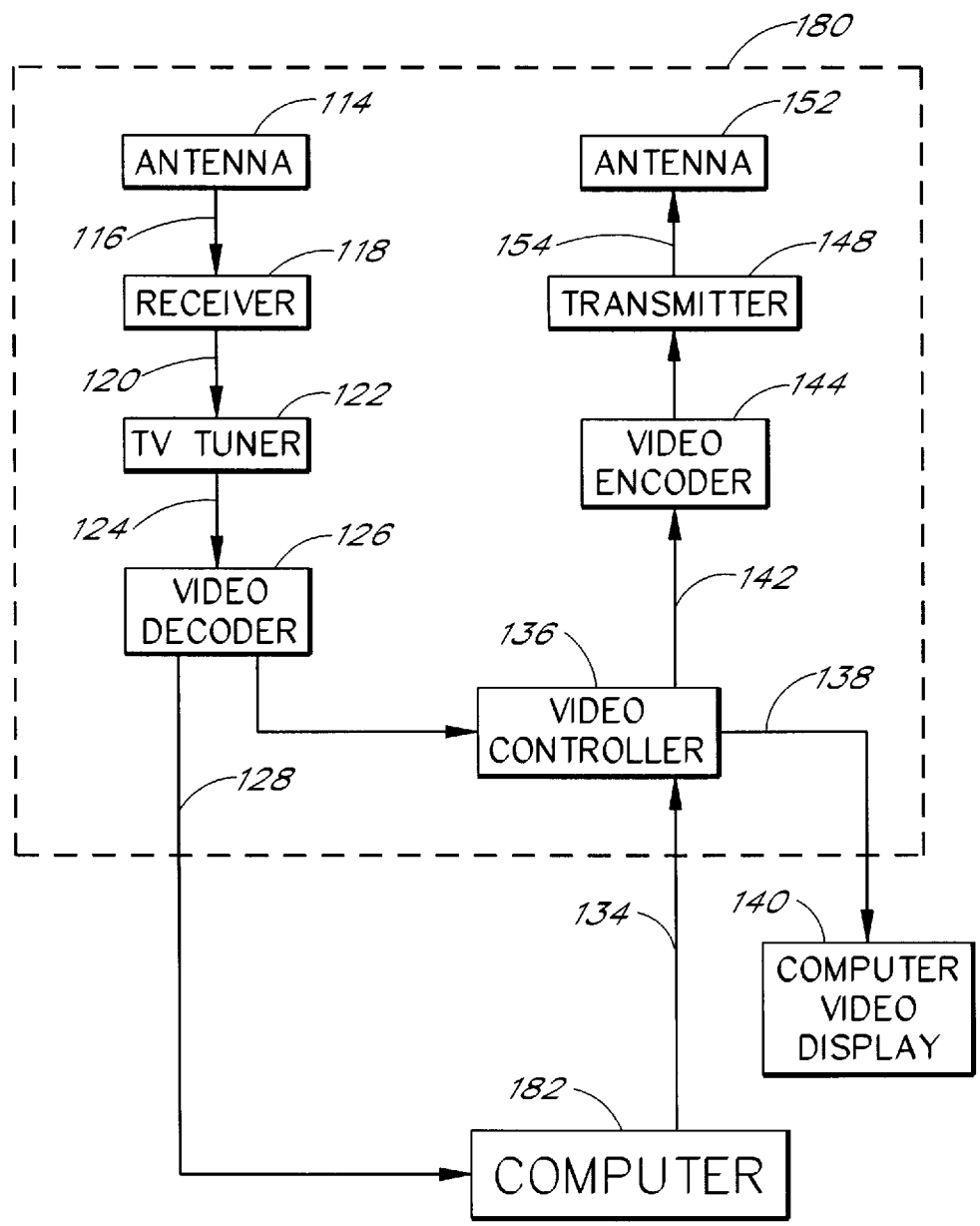
FIG. 3 is a block diagram which shows the computer peripheral device used in the present invention.

The other component of the present invention is a personal computer peripheral device 180 as illustrated in FIG. 3. The personal computer peripheral device 180 comprises the receiver 118 and the corresponding antenna 114 which receive signals via the first channel of the local transmission band. The personal computer peripheral device 180 further comprises the television tuner 122, the video decoder 126, the video controller 136, the video encoder 144, the transmitter 148 and the corresponding antenna 152. The transmitter 148 and the antenna 152 transmit signals via the second channel of the local transmission band. In use, the antenna 11transmitted along a transmitted along a first channel of the local transmission band and sends those signals via the line 116 to the receiver 118. As described above, the receiver 118 downconverts the signals and provides them at the output 120 of the receiver 118 to the television tuner 122. The television tuner 122 converts the broadcast video signal into an analog composite video signal which it supplies along the line 124 to the video decoder 126. The video decoder 126 converts the analog composite video signal into a digital video signal and also extracts vertical blanking interval data from the analog composite video signal. Both the vertical blanking interval data and the digital video signal are supplied to a computer 182 through the computer interface 128. The digital video signal is also provided from the video decoder 126 to the video controller 136 through a line 132. The computer 182 uses application software 130 to process and manipulate the digital video signal and the vertical blanking interval data provided by the video decoder 126. After processing, the computer 182 provides the video controller 136 manipulated video data along a line 134. The video controller 136 provides this data via the line 138 to the computer video display 140 for viewing at a location near the computer 182. The video controller 136 also transmits the data along the line 142 to the video encoder 144 where the data is converted into an analog composite video signal. The analog composite video signal is sent to the transmitter 148 where it is upconverted and amplified for transmission through the antenna 152 over a second channel of the local transmission band, to be received by the receiver 160 in the set-top box 170.

Numerous variations and modifications of the invention will become readily apparent to those skilled in the art. Accordingly, the invention may be embodied in other specific forms without departing from its spirit or essential characteristics. The detailed embodiment is to be considered in all respects only as illustrative and not restrictive, and the scope of the invention is, therefore, indicated by the appended claims rather than by the foregoing description. All changes which come within the meaning and range of equivalency of the claims are to be embraced within their scope.

What is claimed is:

1. A method of establishing a wireless connection between a video device and a computer, the method comprising the steps of:

receiving a television signal at a first location;

upconverting the television signal and transmitting the upconverted signal from the first location;

receiving the upconverted signal at a second location, wherein the upconverted signal is downconverted;

processing the downconverted signal with the computer to produce digital video data;

converting the digital video data into analog composite video, wherein the analog composite video is upconverted and transmitted from the second location; and receiving the upconverted analog composite video at the first location, wherein the upconverted analog composite video is downconverted and input into a video device.

2. The method of claim 1, wherein the processing step further comprises the steps of:

tuning the downconverted signal to provide an analog composite video signal;

separating the analog composite video signal into vertical blanking interval data and a digital video signal;

manipulating the vertical blanking interval data within the computer to create digital data; and combining the digital data with the digital video signal to create the digital video data.

3. The method of claim 1, wherein the television signal is transmitted within the 902–928 MHz frequency band.

4. The method of claim 1, wherein the analog composite video is transmitted within the 902–928 MHz frequency band.

* * * * *